US010782939B2

(12) United States Patent
Gaunt et al.

(10) Patent No.: US 10,782,939 B2
(45) Date of Patent: Sep. 22, 2020

(54) PROGRAM PREDICTOR

(71) Applicant: Microsoft Technology Licensing, LLC, Redmond, WA (US)

(72) Inventors: Alexander Lloyd Gaunt, Cambridge (GB); Sebastian Nowozin, Cambridge (GB); Marc Manuel Johannes Brockschmidt, Cambridge (GB); Daniel Stefan Tarlow, Cambridge (GB); Matej Balog, Bratislava (SK)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 15/671,110

(22) Filed: Aug. 7, 2017

(65) Prior Publication Data

US 2019/0042210 A1 Feb. 7, 2019

(51) Int. Cl.

| | |
|---|---|
| ***G06F 8/35*** | (2018.01) |
| ***G06N 20/00*** | (2019.01) |
| ***G06F 9/445*** | (2018.01) |
| ***G06N 5/00*** | (2006.01) |
| ***G06N 3/04*** | (2006.01) |
| ***G06N 20/20*** | (2019.01) |
| ***G06N 3/08*** | (2006.01) |
| ***G06F 40/18*** | (2020.01) |
| *G06F 17/17* | (2006.01) |
| *G06F 16/10* | (2019.01) |
| *G06F 16/903* | (2019.01) |

(Continued)

(52) U.S. Cl.

CPC ................ *G06F 8/35* (2013.01); *G06F 9/445* (2013.01); *G06F 40/18* (2020.01); *G06N 3/0445* (2013.01); *G06N 3/0454* (2013.01); *G06N 3/0481* (2013.01); *G06N 3/084* (2013.01); *G06N 5/003* (2013.01); *G06N 20/00* (2019.01); *G06N 20/20* (2019.01); *G06F 16/10* (2019.01); *G06F 16/90348* (2019.01); *G06F 17/175* (2013.01); *G06N 5/022* (2013.01); *G06N 20/10* (2019.01)

(58) Field of Classification Search

CPC ........................................................ G06F 8/35

USPC ........................................................ 717/106

See application file for complete search history.

(56) References Cited

U.S. PATENT DOCUMENTS 8,606,739 B2 * 12/2013 Apacible ........... G06F 17/30675 706/50

2003/0101152 A1 * 5/2003 Hicks ........................ G06F 8/30 706/45

(Continued)

OTHER PUBLICATIONS

Alejandro Bellogin, Javier Parapar, and Pablo Castells. 2013. Probabilistic collaborative filtering with negative cross entropy. In Proceedings of the 7th ACM conference on Recommender systems (RecSys '13). ACM, New York, NY, USA, 387-390 (Year: 2013).*

(Continued)

*Primary Examiner* — James D. Rutten

(57) ABSTRACT

A computer program predictor is described which has a processor configured to access a program attribute predictor; and a memory storing a search component configured to search a space of possible programs, to find a program which, given an input data instance and an output data instance, will compute the output data instance from the input data instance, the search being guided by attributes predicted by the attribute predictor given the input data instance and the output data instance.

19 Claims, 10 Drawing Sheets

(51) Int. Cl.
*G06N 5/02* (2006.01)
*G06N 20/10* (2019.01)

(56) References Cited

U.S. PATENT DOCUMENTS

| | | | | |
|---|---|---|---|---|
| 2006/0282818 | A1* | 12/2006 | DeSpain | G06F 17/246 717/109 |
| 2014/0108305 | A1* | 4/2014 | Gulwani | G06F 40/151 706/12 |
| 2014/0236578 | A1* | 8/2014 | Malon | G06F 17/28 704/9 |
| 2017/0200265 | A1* | 7/2017 | Bhaskar | G06T 7/0006 |
| 2018/0025269 | A1* | 1/2018 | Dursun | E21B 44/00 175/24 |
| 2018/0144265 | A1* | 5/2018 | Bonawitz | G06N 5/022 |

OTHER PUBLICATIONS

Albarghouthi, et al., "Recursive Program Synthesis", in Proceedings of the 25th International Conference on Computer Aided Verification, Jul. 13, 2013, 17 Pages.
Alemi, et al., "DeepMath—Deep Sequence Models for Premise Selection", in Proceedings of 30th Conference on Neural Information Processing Systems, Dec. 5, 2016, 9 Pages.
Bhupatiraju, et al., "Deep API Programmer: Learning to Program with APIs", in Journal of the Computing Research Repository, Apr. 2017, 12 Pages.
Bosnjak, et al., "Programming with a Differentiable Forth Interpreter", in Journal of Computing Research Repository, May 2016, 14 Pages.
Bunel, et al., "Adaptive Neural Compilation", in Proceedings of the Advances in Neural Information Processing Systems, Dec. 5, 2016, 25 Pages.
Dayan, et al., "The Helmholtz Machine", in Journal of the Neural Computation, vol. 7, No. 5, Sep. 1995, pp. 889-904.
Dembczynski, et al., "Bayes Optimal Multilabel Classification via Probabilistic Classifier Chains", in Proceedings of the 27th International Conference on Machine Learning, Jun. 21, 2010, 8 Pages.
Dembczynski, et al., "On Label Dependence and Loss Minimization in Multi-label Classification", in Journal of the Machine Learning, vol. 88, Issue 1-2, Jun. 8, 2012, pp. 5-45.
Devlin, et al., "RobustFill: Neural Program Learning under Noisy I/O", Retrieved From: <<https://arxiv.org/pdf/1703.07469.pdf>>, Retrieved Date: Mar. 21, 2017, 18 Pages.
Ellis et al., "Sampling for Bayesian Program Learning", in Proceedings of the 29th Conference on Advances in Neural Information Processing Systems, Dec. 5, 2016, 9 Pages.
Feser, et al., "Synthesizing Data Structure Transformations from Input-Output Examples", in Proceedings of 36th ACM Sigplan Conference on Programming Language Design and Implementation, vol. 50, Issue 6, Jun. 13, 2015, pp. 229-239.
Gaunt, et al., "Terpret: A Probabilistic Programming Language for Program Induction", in Journal of Computing Research Repository, Aug. 2016, pp. 1-50.
Graves, et al., "Hybrid Computing using a Neural Network with Dynamic External Memory", in Journal of Nature, vol. 538, Issue 7626, Oct. 27, 2016, 21 Pages.
Graves, et al., "Neural Turing Machines", in Journal of Computing Research Repository, Oct. 2014, pp. 1-26.
Grefenstette, et al., "Learning to Transduce with Unbounded Memory", in Proceedings of 28th International Conference on Neural Information Processing Systems, Dec. 7, 2015, 14 Pages.
Gulwani, Sumit, "Automating String Processing in Spreadsheets Using Input-Output Examples", in Proceedings of the 38th Annual ACM Sigplan-Sigact symposium on Principles of programming languages, vol. 46, Issue 1, Jan. 26, 2011, 13 Pages.
Gulwani, Sumit, "Programming by Examples: Applications, Algorithms, and Ambiguity Resolution", in Proceedings of the 8th International Joint Conference on Automated Reasoning, Jun. 27, 2016, 6 Pages.
Gulwani, et al., "Synthesis of Loop-Free Programs", in Proceedings of the 32nd ACM Sigplan Conference on Programming Language Design and Implementation, Jun. 4, 2011, pp. 62-73.
Heess, et al., "Learning to Pass Expectation Propagation Messages", in Proceedings of the 26th International Conference on Neural Information Processing Systems, Dec. 5, 2013, pp. 1-9.
Jampani, et al., "The Informed Sampler: A Discriminative Approach to Bayesian Inference in Generative Computer Vision Models", in Journal of the Computer Vision and Image Understanding, vol. 136, Jul. 2015, 20 Pages.
Joulin, et al., "Inferring Algorithmic Patterns with Stack-Augmented Recurrent Nets", in Proceedings of the 28th International Conference on Neural Information Processing Systems, Dec. 7, 2015, 10 Pages.
Kaiser, et al., "Neural GPUs Learn Algorithms", in Proceedings of the 4th International Conference on Learning Representations, May 2, 2016, 9 Pages.
Kingma, et al., "Stochastic Gradient VB and the Variational Auto-Encoder", in Proceedings of the International Conference on Learning Representations, Apr. 14, 2014, 14 Pages.
Kurach, et al., "Neural Random-Access Machines", in Proceedings of the 4th International Conference on Learning Representations, May 2, 2016, 17 Pages.
Li, et al., "Gated Graph Sequence Neural Networks", in Proceedings of the 4th International Conference on Learning Representations, May 2, 2016, 20 Pages.
Ling, et al., "Latent Predictor Networks for Code Generation", in Proceedings of the 54th Annual Meeting of the Association for Computational Linguistics, Aug. 7, 2016, 11 Pages.
Loos et al., "Deep Network Guided Proof Search", in Journal of Computing Research Repository, Jan. 2017, 20 Pages.
Menon, et al., "A Machine Learning Framework for Programming by Example", in Proceedings of the 30th International Conference on Machine Learning, Jun. 16, 2013, 9 Pages.
Neelakantan, et al., "Neural Programmer: Inducing Latent Programs with Gradient Descent", in Proceedings of the 4th International Conference on Learning Representations, May 2, 2016, 17 Pages.
Piech, et al., "Learning Program Embeddings to Propagate Feedback on Student Code", in Proceedings of the 32nd nternational Conference on Machine Learning, Jul. 6, 2015, 10 Pages.
Polozov, et al., "FlashMeta: a Framework for Inductive Program Synthesis", in Proceedings of the ACM Sigplan International Conference on Object-Oriented Programming, Systems, Languages, and Applications, Oct. 25, 2015, pp. 107-126.
Raychev, et al., "Learning Programs from Noisy Data", in Proceedings of the 43rd Annual ACM Sigplan-Sigact Symposium on Principles of Programming Languages, Jan. 20, 2016, 14 Pages.
Reed, et al., "Neural Programmer-Interpreters", in Proceedings of the 4th International Conference on Learning Representations, May 2, 2016, 13 Pages.
Schkufza, et al., "Stochastic Program Optimization", in Journal of Communications of the ACM, vol. 59, Issue 2, Feb. 2016, pp. 114-122.
Shotton, et al., "Real-Time Human Pose Recognition in Parts from Single Depth Images", in Journal of Communications of the ACM, vol. 56, Issue 1, Jan. 1, 2013, pp. 116-124.
Singh, Rishabh, "BlinkFill: Semi-Supervised Programming by Example for Syntactic String Transformations", in Proceedings of the VLDB Endowment, vol. 9, Issue 10, Jun. 2016, pp. 816-827.
Singh, et al., "Predicting a Correct Program in Programming by Example", in Proceedings of the 27th International Conference on Computer Aided Verification, Jul. 18, 2015, 12 Pages.
Solar-Lezama, Armando, "Program Synthesis by Sketching", in PhD thesis of University of California, Jan. 2008, 214 Pages.
Stuhlmuller, et al., "Learning Stochastic Inverses", in Proceedings of the 26th Conference on Advances in Neural Information Processing Systems, Dec. 5, 2013, 9 Pages.
Sukhbaatar, et al., "End-to-End Memory Networks", in Proceedings of the 28th Conference on Advances in Neural Information Processing Systems, Dec. 7, 2015, 11 Pages.
Weston, et al., "Memory Networks", in Proceedings of the 3rd International Conference on Learning Representations, May 7, 2015, 15 Pages.

(56) References Cited

OTHER PUBLICATIONS

Zaremba, et al., "Learning Simple Algorithms from Examples", in Proceedings of the 33rd International Conference on Machine Learning, Jun. 19, 2016, 12 Pages.

* cited by examiner

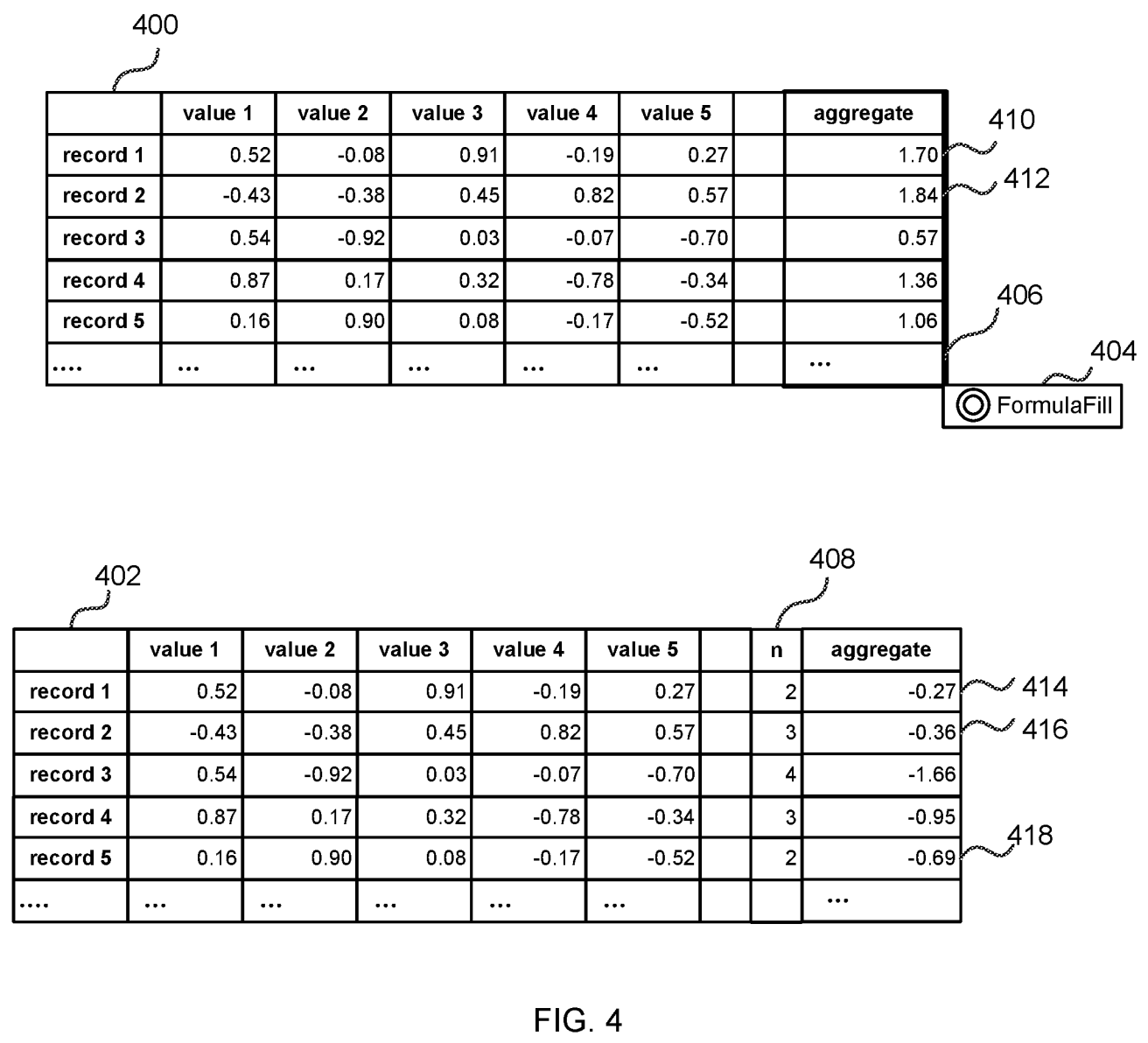

| | value 1 | value 2 | value 3 | value 4 | value 5 | | aggregate |
|---|---|---|---|---|---|---|---|
| record 1 | 0.52 | -0.08 | 0.91 | -0.19 | 0.27 | | 1.70 |
| record 2 | -0.43 | -0.38 | 0.45 | 0.82 | 0.57 | | 1.84 |
| record 3 | 0.54 | -0.92 | 0.03 | -0.07 | -0.70 | | 0.57 |
| record 4 | 0.87 | 0.17 | 0.32 | -0.78 | -0.34 | | 1.36 |
| record 5 | 0.16 | 0.90 | 0.08 | -0.17 | -0.52 | | 1.06 |
| .... | ... | ... | ... | ... | ... | | ... |

| | value 1 | value 2 | value 3 | value 4 | value 5 | | n | aggregate |
|---|---|---|---|---|---|---|---|---|
| record 1 | 0.52 | -0.08 | 0.91 | -0.19 | 0.27 | | 2 | -0.27 |
| record 2 | -0.43 | -0.38 | 0.45 | 0.82 | 0.57 | | 3 | -0.36 |
| record 3 | 0.54 | -0.92 | 0.03 | -0.07 | -0.70 | | 4 | -1.66 |
| record 4 | 0.87 | 0.17 | 0.32 | -0.78 | -0.34 | | 3 | -0.95 |
| record 5 | 0.16 | 0.90 | 0.08 | -0.17 | -0.52 | | 2 | -0.69 |
| .... | ... | ... | ... | ... | ... | | | ... |

FIG. 4

PROGRAM PREDICTOR

BACKGROUND

Inductive program synthesis is the task of automatically inferring a program that is consistent with an incomplete specification such as input-output examples, execution trace examples, natural language descriptions of the task. In an ideal scenario, a user supplies a small set of input examples and the corresponding desired outputs, and a computer infers a consistent underlying program. However, it is very difficult to achieve this aim in a practical, efficient manner and in a way which gives workable results that are expressed in interpretable source code. This is because the space of possible syntactically correct programs to be searched is vast and difficult to search effectively.

Inductive program synthesis is useful for many practical applications where input and output examples are observed and it would be helpful to have a program to express how to compute between the input and output examples and which generalizes to future such input and output examples. Various examples of such practical applications are given in the detailed description.

The embodiments described below are not limited to implementations which solve any or all of the disadvantages of known program prediction systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computer program predictor is described which has a processor configured to access a program attribute predictor; and a memory storing a search component configured to search a space of possible programs, to find a program which, given an input data instance and an output data instance, will compute the output data instance from the input data instance, the search being guided by attributes predicted by the attribute predictor given the input data instance and the output data instance.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 4 shows an example of an observed system comprising a spreadsheet and showing a formula fill facility provided to a user;

Like reference numerals are used to designate like parts in the accompanying drawings.

DETAILED DESCRIPTION

Figure 1:
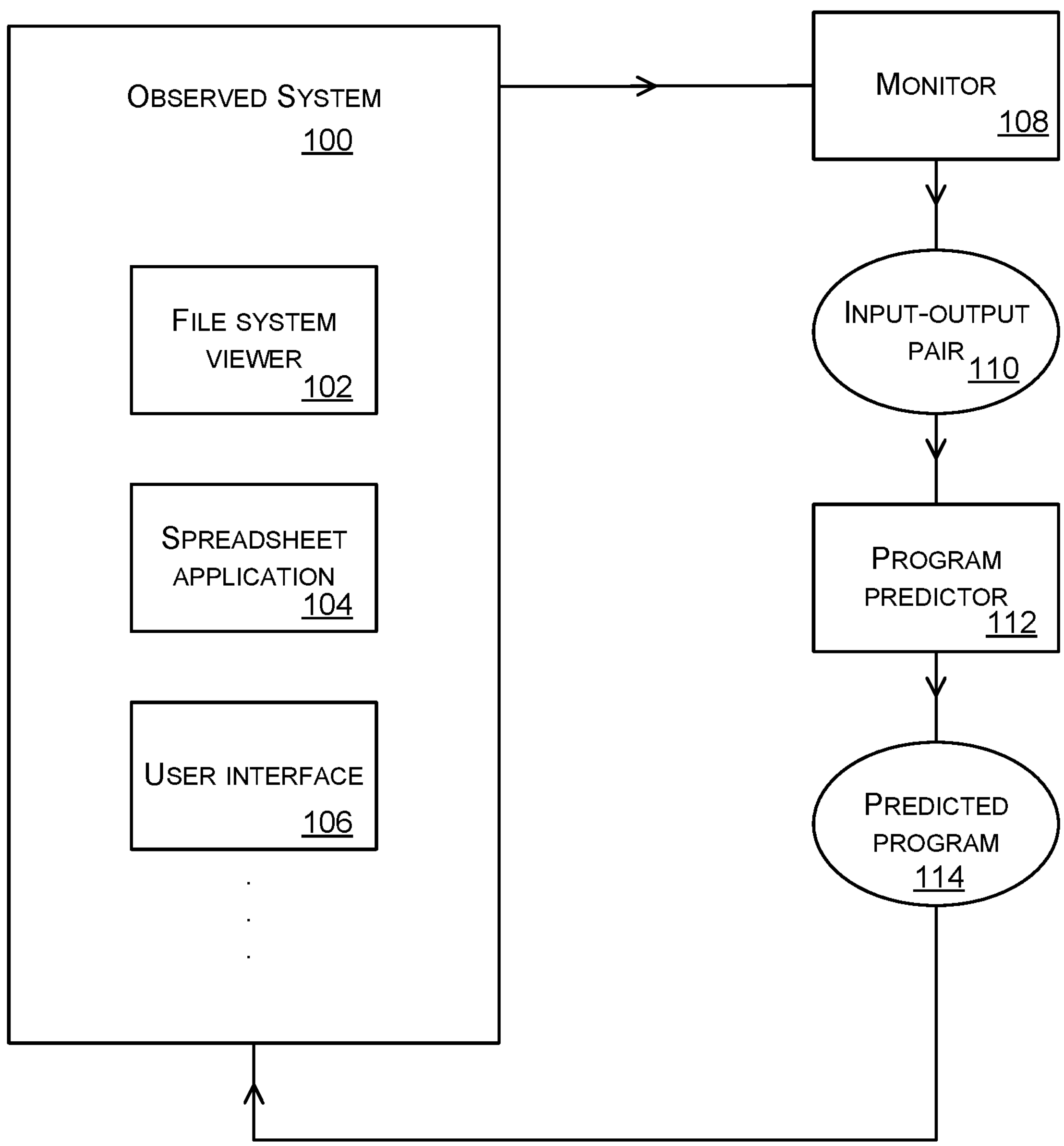
FIG. 1 is a schematic diagram of an observed system and a program predictor for predicting programs to be used to assist a human with control or operation of the observed system.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The technology described herein is concerned with inductive program synthesis whereby, given a space of all syntactically correct programs in a given programming language, there is a search in this space for a program which fits at least one input-output example. The input-output example (or sometime several input-output examples) are provided, such as by a person or by a computing entity, and the search finds a program that agrees with the available input-output example(s). This is an extremely challenging problem due to the combinatorial size and discrete nature of the search space.

Carrying out an exhaustive search of the program space is typically not practical. A satisfiability (SAT) solver, or a satisfiability modulo theory (SMT) solver may be used with a number of hand crafted heuristics to organize the search and discard areas of search space once they are proven not to contain a solution. However, SAT solvers and SMT solvers do not learn from past experience. The heuristics of these solvers are hand crafted manually specified heuristics and are not learned from data. If two or more possible programs are found by a SAT solver or a SMT solver which fit the input-output specification there is no bias towards more natural programs that generalize well to unseen inputs.

A SAT-solver is a heuristic algorithm which is able to solve problem instances involving tens of thousands of variables and formulas consisting of millions of symbols, which is sufficient for many practical SAT problems. A SAT problem asks whether the variables of a given Boolean formula can be consistently replaced by the values TRUE or FALSE in such a way that the formula evaluates to TRUE. A satisfiability modulo theory (SMT) problem is an extension of a SAT problem that additionally allows the use of numbers, arrays, strings, uninterpreted functions and others as values and variables and constraints restricting such values. Where these enriched problems are used the heuristic solver is referred to as an SMT solver.

A computer program predictor is described which has a processor configured to access a program attribute predictor having been trained on information about a plurality of programs, the information comprising: pairs of input and output data of the programs, and attributes of the programs. The program attribute predictor is machine learning processing provided as a web service in some examples or is a service provided by another entity separate from the computing entity where the computer program predictor is located. An attribute of a program is any property of a program which can be inferred from the program. For example, an attribute may indicate the presence or absence of specific instructions in the program. Additional examples are given later in this document.

The computer program predictor also has a memory storing a search component configured to search a space of possible programs, to find a program which, given an input data instance and an output data instance, will compute the output data instance from the input data instance, the search being guided by attributes predicted by the attribute predictor given the input data instance and the output data instance. The search component is provided as a web service in some examples.

By using the computer program predictor an end user is offered a predicted computer program which fits available input-output examples. This assists the user to automate tasks such as user input tasks at a human-computer interface, designing formulae for completing data in spreadsheets and other tasks. In the case of a file system viewer a user is able to complete a first file organization task manually and is then offered a predicted program for completing the same type of task on different file instances, in a manner which generalizes from the manually completed example to other examples. This assists the user in a variety of ways such as: writing spreadsheet formulae, writing computer programs, reducing the burden of data input to a computing device, and others. The computer program predictor is able to learn from past experience by training the program attribute predictor. The computer program predictor is thus able to improve the functioning of a computing process or computing device since processing is achieved more efficiently and/or less memory is used.

FIG. 1 is a schematic diagram of an observed system 100 such as a file system viewer 102, a spreadsheet application 104, a user interface 106 or any other observed system which has inputs and outputs. A monitor 108, which may be a human or an automated process, monitors the observed system 100 to detect input-output pairs 110. An input-output pair is data observed as input to a process and data observed as output from the process in response to the input data. The input-output pair(s) are sent to a program predictor 112 which predicts a program 114 that describes a process for generating the output from the input and which is generalizable to other unseen inputs. An unseen input is an instance of input data which has not previously been encountered by the program predictor 112. The program predictor 112 is described in more detail with reference to FIG. 2 and it comprises a machine learning component so that the program predictor 112 is able to learn either as an offline learning process, an online learning process or using a hybrid of these approaches.

In the case that the observed system is a file system viewer 102, an input-output pair may be a path name of a file before and after a user changes the location of the file in the file system. The program predictor is able to predict a program suitable for carrying out the file path manipulation and which generalizes to other examples, so that a user can be assisted by offering use of the program facility for manipulating file paths of other files. This is described in more detail with reference to FIGS. 5A to 5C later in this document.

In the case that the observed system is a spreadsheet application 104, an input output pair may be data in cells of the spreadsheet. The program predictor is able to predict programs in the form of spreadsheet formulae and offer these to assist a user in manipulating data in the spreadsheet and/or to fill in cells of the spreadsheet. An example where the observed system is a spreadsheet application is described below with reference to FIG. 4.

In the case that the observed system is a user interface 106, the input-output pair comprises user input event data and associated outcomes at a computing device controlled by the user interface. The program predictor is able to predict programs to assist the user by carrying out tasks such as attaching documents to an email, filing a document in a document management system and other tasks which use frequent and/or complex sequences of user input events.

Other types of observed system 100 may be used and the examples given in FIG. 1 are illustrative rather than limiting of the technology.

Figure 2:
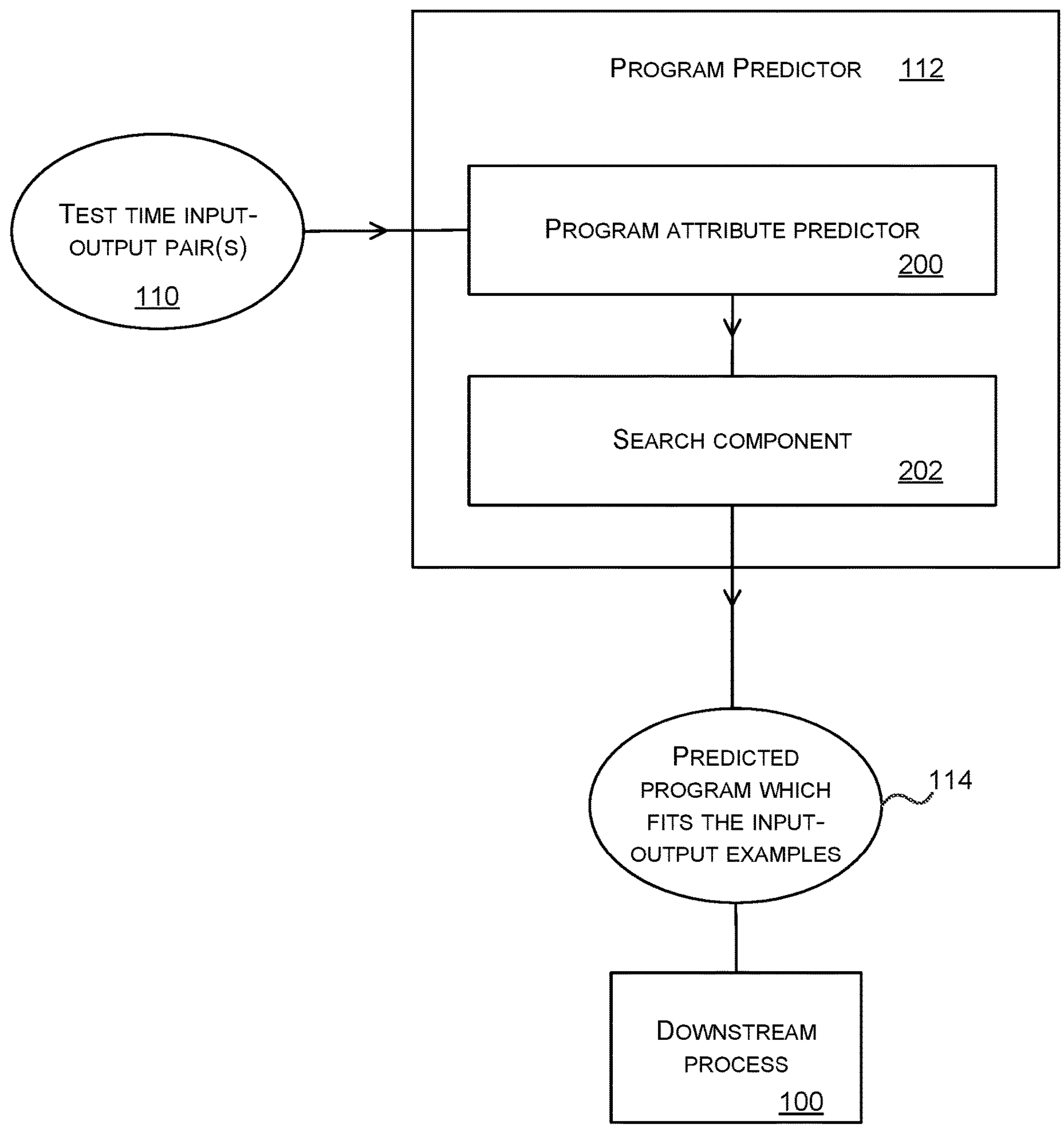
FIG. 2 is a schematic diagram of the program predictor of FIG. 1 in more detail.

FIG. 2 shows the program predictor 112 of FIG. 1 in more detail. It comprises a program attribute predictor 200 and a search component 202. The program attribute predictor 200 takes one or more input-output pairs 110 as input and computes predicted attributes of a program which fits the input-output pair(s) 110. The predictions are used by the search component 202 to search a space of syntactically correct programs and predict a program 114 which fits the input-output pair(s) 110 and is able to generalize to other input-output pairs. The predicted program is made available to a downstream process 100 such as any of the observed systems of FIG. 1.

The program attribute predictor is a machine learning system which has been trained using pairs of input-output data and attributes of programs which fit the input-output data pairs. For example, the machine learning system comprises one or more of: a neural network, a random decision forest, a kernel method, a linear logistic regression.

Attributes of a program are any characteristics of a program. A non-exhaustive list of examples of program attributes is: an indicator of the presence or absence of a particular function in the program, an indicator of whether a specified function is the first or last function used in the program, the presence or absence of a loop in the program, a number of different functions used in the program, the number of variables used in the program. The choice of which attributes to use is made manually by an operator and on the basis of empirical evidence. Attributes which are predictable and which are able to reveal as much information as possible about a search space are selected.

The attribute predictions computed by the program attribute predictor 200 are used to guide a search of program space by a search component 202. The search component is any algorithm for searching a space of syntactically correct programs of a programming language in which the predicted program is expressed.

The search component 202 evaluates possible instructions of the domain specific language to see if they are able to compute one or more of the output examples from the input examples. If not, it adds another instruction to the possible instruction being explored and evaluates the resulting program using the input-output examples. The order of exploration through the search space is influenced by the results of the program attribute predictor. In other words, the search component is configured such that when it extends a partial program by a new instruction, it has to search for the new instruction by exploring the available instructions of the domain specific language (DSL) in a particular order. The order is influenced by the predicted attributes from the program attribute predictor 200. For example, the program attribute predictor predicts a probability value for each of a plurality of possible functions of the DSL and the search procedure searches for a new function to add to the program, from the plurality of possible functions, by trying those one by one, in an order influenced by the probability values. The most likely attributes, as predicted by the program attribute predictor, are assessed first.

In an example, the search component 202 uses an optimized version of depth first search to search over programs with a maximum length and this is found to give good working results. It is also possible to derive heuristic cost functions from the attribute predictions and use those to drive a wide variety of search algorithms such as the A*algorithm or best-first search algorithms. In another example a beam search algorithm is used by the search component.

In another example, the search component 202 uses a sort and add enumeration. A sort and add enumeration is a search procedure which maintains a set of active functions and performs depth first search with the active function set only. The active functions are selected according to the probability values computed by the program attribute predictor, so that the top k most probable functions are in the active set. Whenever the search fails, the next most probable function(s) are added to the active set and the search restarts with this larger active set.

In another example, the search component 202 uses an SMT program synthesis tool which operates to synthesize programs by filling in "holes" in incomplete source code so as to match requirements. The function in each step of a program in the DSL and its arguments are treated as the "holes" and the requirement to be satisfied is consistency with the provided set of input-output examples. This is combined with a sort and add enumeration as the possibilities for each "hole" are restricted to an active set.

In another example, the search component 202 uses a program synthesis tool which combines enumerative search with deduction to prune the search space. It infers small functional programs for data structure manipulation from input-output examples, by combining functions from a provided library. A sort and add scheme is used by choosing the library of functions according to the predictions from the program attribute predictor.

In an example, the search component 202 uses a depth first search procedure to search over programs with a given maximum length. The procedure begins by choosing the first function (and its arguments) of a potential solution program, and then recursively considering ways of filling in the rest of the program (up to length T), before moving on to a next choice of first instruction (if a solution has not yet been found). A program is considered a solution if it is consistent with all available input-output examples. To do this the candidate programs are evaluated on the input examples and the results checked against the known corresponding output examples. It is possible to exploit the sequential structure of the programs in the example DSL given below, by caching the result of evaluating prefixes of the currently considered program on the example inputs, thus allowing efficient reuse of computation between candidate programs with common prefixes.

Alternatively, or in addition, the functionality of the program predictor 112 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3:
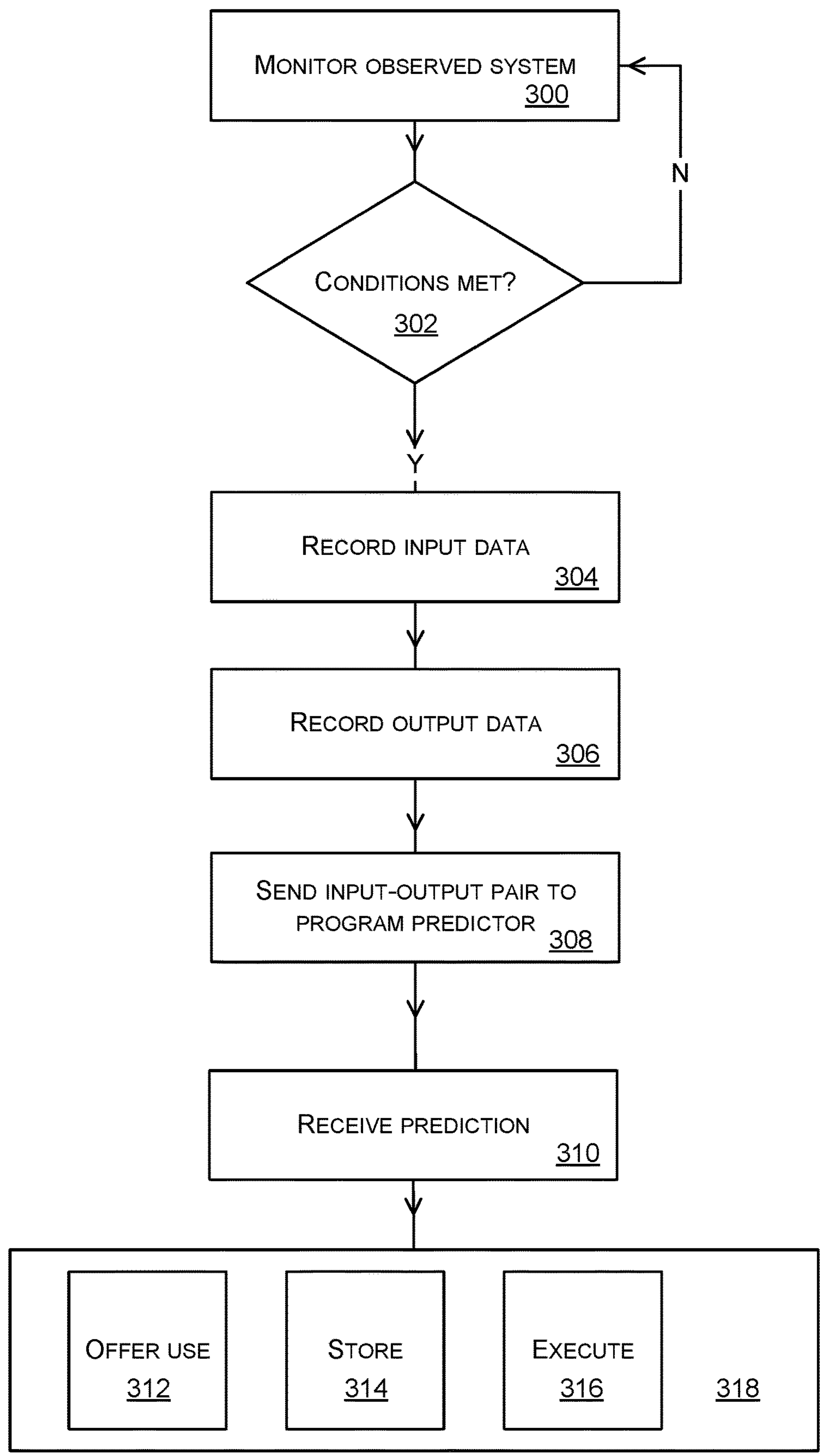
FIG. 3 is a flow diagram of a method of use of the program predictor of FIG. 1.

FIG. 3 is a flow diagram of a method of use of the program predictor. A monitor such as monitor 108 of FIG. 1 monitors 300 an observed system 100 and checks whether conditions are met 302. For example, the monitor is software which observes user input events made in connection with a file system viewer. The monitor checks whether a path name of a file is changed. If so, the monitor records input data 304 and records output data 306. In the case of the file system viewer example, the input data is an original path name and the output data is a final path name of a given file. The monitor sends the input-output pair to the program predictor 308 and receives a predicted program 310 which is able to transform between the input data and the output data, and to generalize to other examples of the input data and the output data. The predicted program is sent to a downstream system 318 such as by being offered to the user for use 312, stored 314 or executed 316.

FIG. 4 shows an example of an observed system comprising a spreadsheet 400 and showing a formula fill facility 404 provided to a user. A user has a dataset and wishes to perform an aggregation function on each row or column of the data. The user manually works out the aggregation for the first two rows and asks the program predictor to provide a spreadsheet formula which fits the manually provided examples. This formula is then automatically applied to the remaining rows (or columns) to calculate the desired aggregations. The result is both completion of the aggregation task and expose of a spreadsheet formula which can be adapted or debugged by the user.

Suppose the user has the dataset indicated in spreadsheet 400 of FIG. 4 and has provided two aggregation examples shown in cells 410 and 412. The aggregation function that the user has in mind is "sum all values greater than zero". The program predictor is able to infer this intention and predict a program which generalizes from these examples. The first input-output pair comprises the numerical values in the first row of the spreadsheet 400 as the input data, and the numerical value in cell 410 as the output data. The second input-output pair comprises the numerical values in the second row of the spreadsheet 400 as the input data and the numerical value in cell 412 as the output data. The user selects the range of cells where the desired aggregation result is to be displayed as indicated by rectangle 406 and an option 404 to fill the range with a formula is presented to the user. The program predictor predicts a suitable formula which is entered into all cells in the range of cells 406 to fill in the remaining values.

In the above example, the predicted program, expressed in a specific programming language referred to as a domain specific language, is:

a←[input]

b←FILTER(>0)a c←SUM b which may be expressed in a spreadsheet formula notation as:

=SUMIF([input], ">0")

Consider a more complex example where the target spreadsheet formula is non-trivial. Consider the case where the user has an aggregation function "sum the smallest n values" in a record, where n is provided as an additional input. This case is sufficiently complex to expect that most spreadsheet users would have to look up the composition of functions required to achieve the result and it is thus easier for the user to just calculate manually the first few answers as examples for the program predictor. The spreadsheet 402 of FIG. 4 shows this situation. The user has manually calculated the values in cells 414 and 416 and gives a range of cells indicated by rectangle 418 to be completed. The program predictor predicts the following program expressed in a domain specific language of the program predictor:

a←[value 1:5]
b←n
c←SORT a
d←TAKE b c
e←SUM d and which is expressed as a spreadsheet formula as:

{=SUMPRODUCT(SMALL([value 1:5],ROW(INDIRECT[CONCAT("1:",n)))))}

Figure 5A:
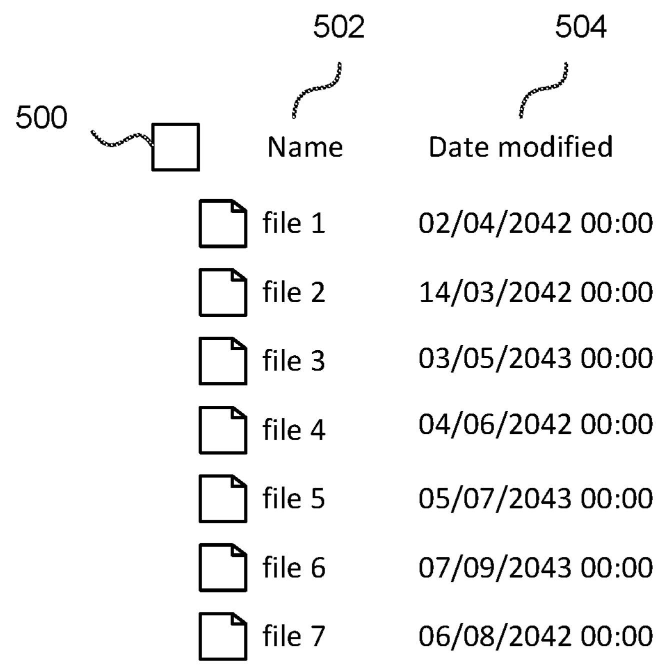
FIG. 5A is a schematic diagram of a file system viewer.

FIG. 5A is a schematic diagram of a file system viewer which presents a graphical user interface to an end user comprising a column 502 of file names listing a plurality of files 500 (in this case 7 files) and a corresponding column 504 containing a data at which the corresponding file was last modified. The monitor 108 in this case is software which records recent user actions at the file system viewer and recognizes patterns in the recorded user actions. When a pattern is found the file system viewer sends one or more input-output pairs of the pattern to the program predictor and offers to apply the predicted program which it receives, to remaining files in the file system.

Figure 5B:
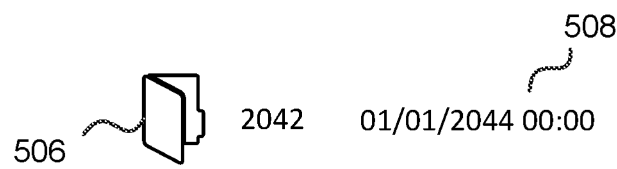
FIG. 5B is a schematic diagram of a folder created by a user in the file system viewer of FIG. 5A.
Figure 5C:
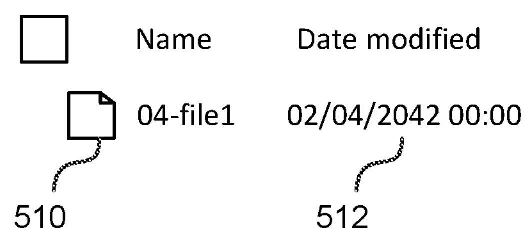
FIG. 5C is a schematic diagram of a renamed file created by a user in the file system viewer of FIG. 5A.

Suppose a user is organizing the list of files of FIG. 5A into a metadata-dependent directory structure by creating subdirectories for each calendar year, moving files into them and extending the filename to include the month in which the file was created. The user first creates a directory for the first file as indicated in FIG. 5B. FIG. 5B is a schematic diagram of a folder (also referred to as a directory) created by a user in the file system viewer of FIG. 5A. In this example the folder has the name 2042. The user moves file 1 into the folder 2042 and renames the file as "04-file1" as illustrated in FIG. 5C.

The monitor 108 records the input data as "file 1" and records the output data as "2042/04-file1". This input-output pair is provided to the program predictor which predicts a program such as the following program expressed in a domain specific language of the program predictor:

a←[input]
b←YearCreated(a)
c←MonthCreated(a)
d←Concat(c, "-",a)
e←Join(b,d)

Which may be presented to the end user as

Move File to "(Year of File)/(Month of File)-File"
Would move
File 2 to 2042/03-file2
File 3 to 2043/05-file3
. . .

Figure 6:
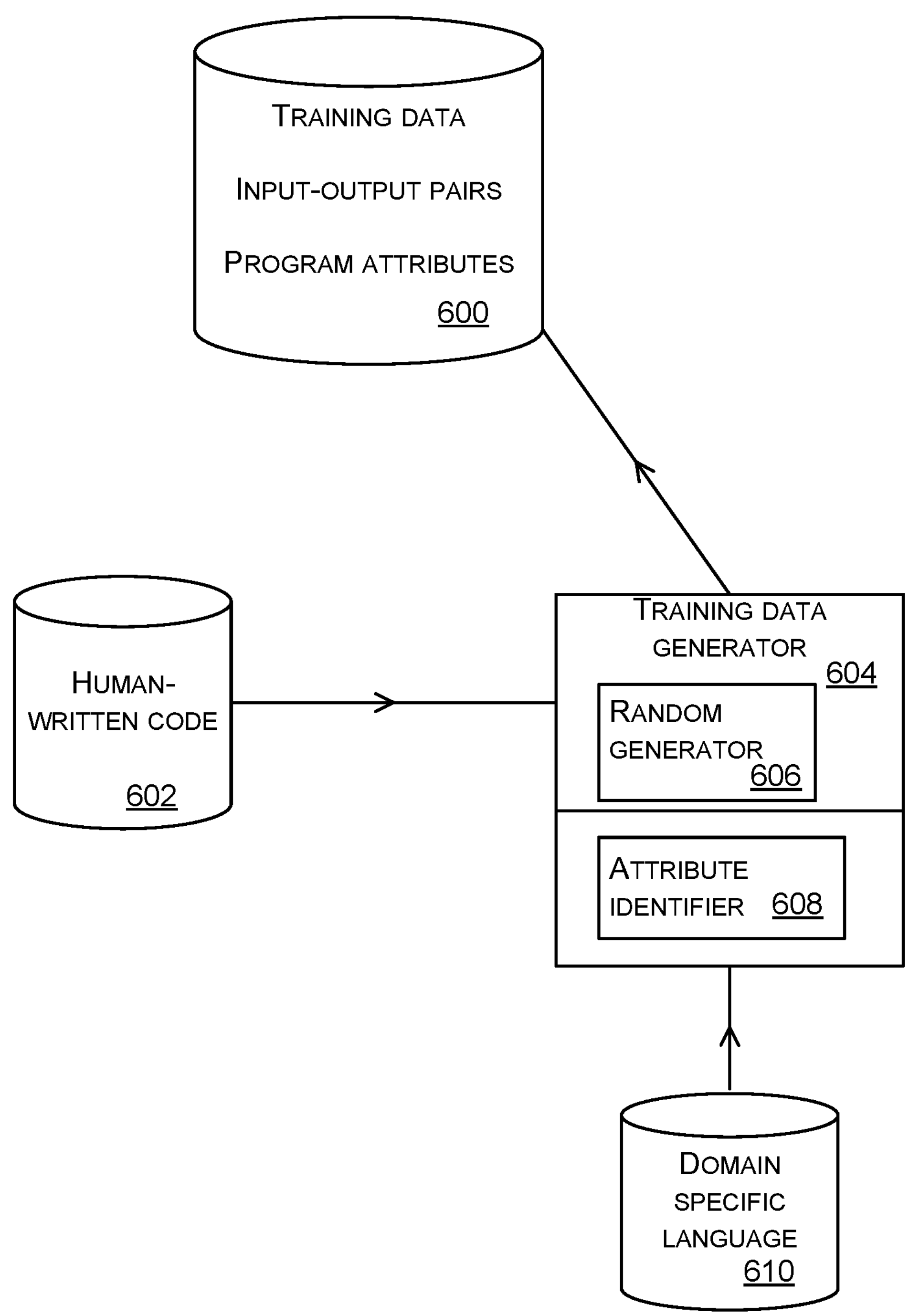
FIG. 6 is a schematic diagram of a training data generator.

FIG. 6 is a schematic diagram of an apparatus for generating training data to train the program attribute predictor. A training data generator, which is computer implemented, has access to a domain specific language 610 to be used by the program predictor. A domain specific language is a programming language which is limited such that the search space of the search component is also limited, in order to enable results to be found in practical time scales.

The training data generator 604 comprises an attribute identifier 608 which is software to identify the presence or absence of specified program attributes in a given program. The training data generator 604 also comprises a random generator 606 configured to randomly generate programs which are syntactically correct in the domain specific language 610, and which but which may or may not be useful. The random generator also randomly generates inputs for the randomly generated programs. The training data generator 604 executes the randomly generated programs using the randomly generated inputs to compute output data. In this way input-output pairs and corresponding programs are generated. The attribute identifier 608 identifies specified attributes of the randomly generated programs by using rules and inspecting the randomly generated programs. The identified attributes are stored together with the corresponding input-output pairs in a corpus of training data 600.

In some examples the training data generator has access to human written code 602 but this is not essential. In this case the random generator generates random inputs for the human written code and executes the human written code using the inputs to obtain output data. The attribute identifier 608 identifies attributes of the human written code in the same way as for the randomly generated code. The attributes and input-output pairs are stored in the corpus of training data 600. By using human written code to generate at least some of the training data 600 the program predictor is more likely to generate programs which appear natural to humans.

Figure 7:
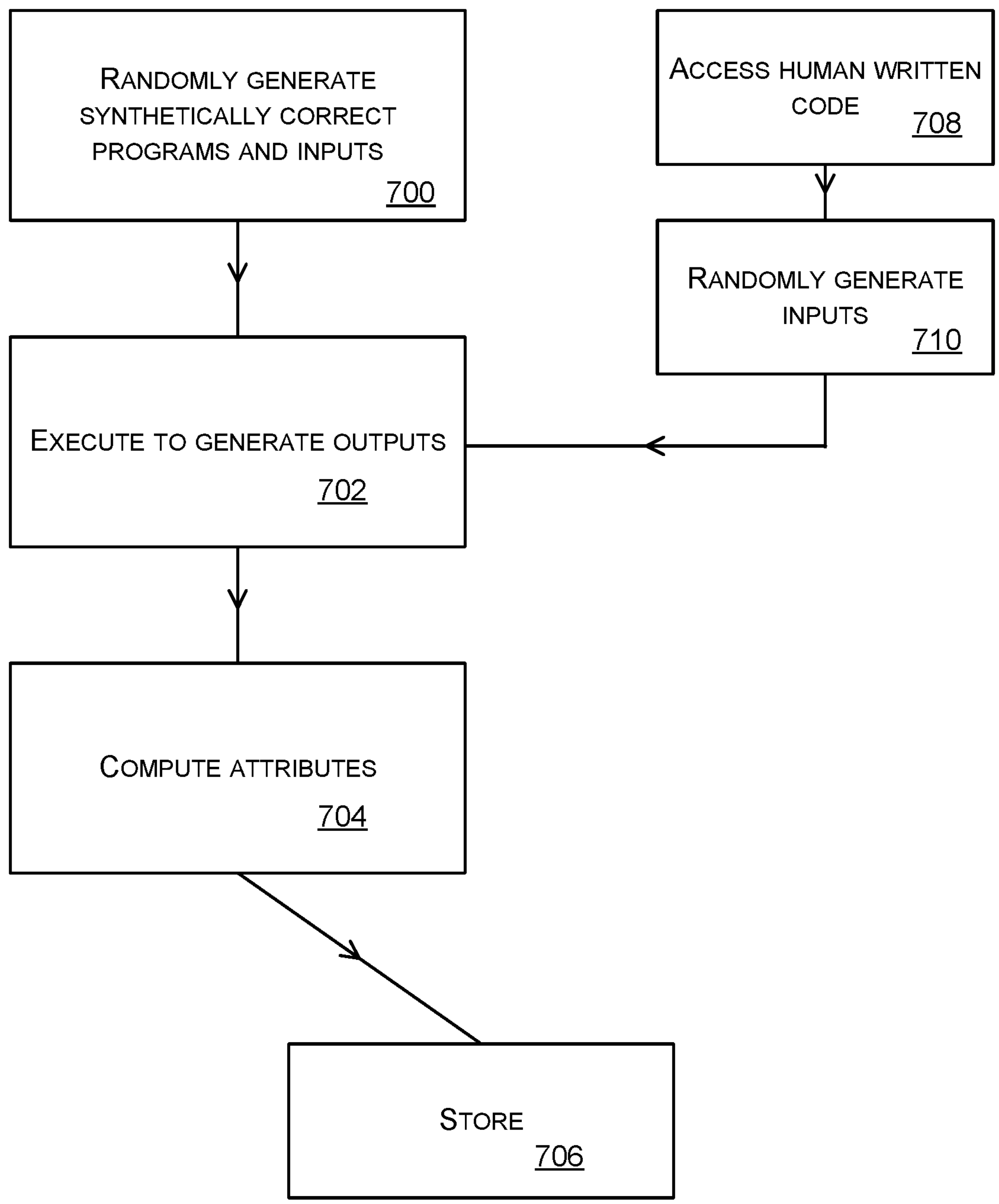
FIG. 7 is a flow diagram of a method of operation of the training data generator of FIG. 6.

FIG. 7 is a flow diagram of a method of operation at the training data generator of FIG. 6. The random generator randomly generates syntactically correct programs and inputs 700. The randomly generated programs are executed to generate outputs 702. Attributes of the randomly generated programs are computed 704 and the training data is stored 706. In some cases, human written code is accessed 708 and inputs for this code are randomly generated 710. The operations 702 to 706 then occur to generate and store the training data.

As mentioned above the training data is generated according to a domain specific language (DSL) 610 (see FIG. 6) and the search space of the search component is defined using the domain specific language. In an example the DSL defines a program as a sequence of function calls where the result of a call initializes a fresh variable that is either a singleton integer or an integer array. Functions are applied to any of the inputs or previously computer (intermediate) variables. The output of the program is the return value of the last function call which is the last variable. In the example DSL the following first-order functions are available HEAD, LAST, TAKE, DROP, ACCESS, MINIMUM, MAXIMUM, REVERSE, SORT, SUM as well as the higher order functions MAP, FILTER, COUNT, ZIPWITH, SCANL1. Higher-order functions require lambda functions for their behavior to be fully specified: for MAP the example DSL provides lambdas (+1), (−1), (*2), (/2), (*(−1)), (**2), (*3), (/3), (*4), (/4); for FILTER and COUNT there are predicates (>0), (<0), (%2==0), (%2==1) and for ZIPWITH and SCANL1 the example DSL provides lambdas (+), (−), (*), MIN, MAX. Semantics of the functions of the example DSL are provided later in this document.

Once the training data 600 is available it is used by a training process 800 to train a machine learning system to produce a trained program attribute predictor 200. The machine learning system is any machine learning system which is suitable for variable sized inputs and examples have been discussed earlier in this document.

Figure 9:
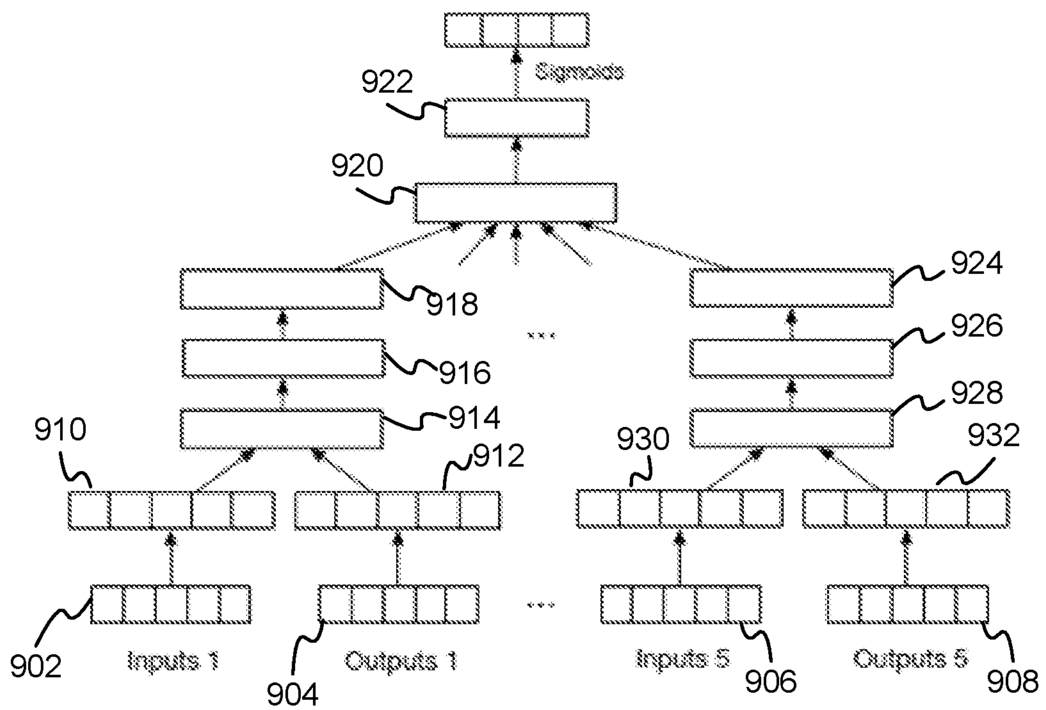
FIG. 9 is a schematic diagram of a neural network architecture used in a program attribute predictor.

In an example the machine learning system is a neural network such as that of FIG. 9. However, this is an example only and is not intended to limit the scope of the technology.

The machine learning system is trained to predict a distribution of program attributes given input-output examples. Any machine learning system can be used where the input component is able to encode the input-output examples and where the output is a distribution over a specified number of possible program attributes. In the case that the distribution of program attributes is expressed as a fixed size binary vector representing a histogram over possible program attributes, it is possible to use a neural network with independent sigmoid outputs. In the case that the attributes are variable in size, then a recurrent neural network output is used. It is also possible to use other types of machine learning system as mentioned earlier in this document.

In the example of FIG. 9 the neural network comprises an encoder and a decoder. The encoder computes a vector of numerical values which represent input-output examples of a single program. In more detail, the encoder is a differentiable mapping from a set of M input-output examples generated by a single program to a latent real-valued vector. The decoder takes the output of the encoder and uses it to compute predictions of attributes of the program. The decoder is a differentiable mapping from the latent vector produced by the encoder to predictions of attributes of the program. In the example of FIG. 9 the encoder comprises neural network layers 902 to 918 and 924 to 932. In the example of FIG. 9 the output of the encoder is represented by rectangle 920. In the example of FIG. 9 the decoder comprises neural network layers 920 and 922.

In the example of FIG. 9 the encoder uses a feed-forward architecture which is simple and easy to train as well as being found empirically to give good results. The input and output types (singleton or array) are represented by a one-hot-encoding and the inputs and outputs are padded to a maximum length with a null value. Each integer in the inputs and in the output is mapped to a learned embedding vector with a specified size. In an example the range of integers is restricted to a finite range and each embedding is parameterized individually. For each input-output example separately, the embeddings of the input types, the inputs, the output type and the output are concatenated into a single fixed length vector (914 for inputs 1 and outputs 1 in FIGS. 9 and 928 for inputs 5 and outputs 5 in FIG. 9). This vector is passed through three hidden layers such as hidden layers 914, 916, 918 or hidden layers 928, 926, 924 comprising a plurality of sigmoid units. The third hidden layer thus provides an encoding of each individual input-output example.

For input-output examples in a set generated from the same program, the encodings are pooled by averaging or other aggregation processes. This is illustrated in FIG. 9 by the plurality of arrows which enter encoder result layer 920. In this way the encodings of a plurality of individual input-output examples of a given program are pooled together.

In the example of FIG. 9 the decoder is configured to multiply the encoding it receives from the encoder using a learned matrix. The learned matrix comprises one row for each possible program attribute. The resulting numbers are treated as probabilities of each program attribute.

In an example the neural network of FIG. 9 is trained using negative cross entropy and this is found empirically to give good results. Training data which has been generated as described above with reference to FIG. 6 and FIG. 7 is accessed and the input-output examples are fed into the neural network in a forward propagation process. Output values are computed by the decoder and comprise predictions of a specified plurality of program attributes. For example, the output values comprise a numerical probability value for each of a specified plurality of attributes and express how likely the program is to contain the relevant attribute. The output values are compared with ground truth attributes of the known program which produced the input-output pairs, from the training data. The differences are used to update parameters of the decoder by defining a loss function related to the differences and minimizing the loss function using negative cross entropy as the training objective. Negative cross entropy is a measure of the average number of bits needed to identify an event drawn from one of two probability distributions from which the event is drawn. Backpropagation is used to update parameters of the various layers of the neural network using the negative cross entropy objective.

It is also possible to train the neural network using other training objectives such as mean squared error, Hinge loss, scoring rules, or loss functions.

In the example of FIG. 9 the neural network architecture is modified in some examples by replacing the feed-forward encoder by a recurrent neural network (RNN). Using a gated recurrent unit-based RNN has been found empirically to give good working results as compared with the architecture of FIG. 9.

As mentioned above other types of machine learning system form the program attribute predictor in some examples. The task is a multilabel classification problem where each instance (set of input-output examples) is associated with a set of relevant labels (attributes of the program that generated the input-output examples). Thus any suitable machine learning classifier is used to form the program attribute predictor.

In an example, the machine learning system is a random decision forest comprising a plurality of random decision trees.

A random decision tree comprises a root node, a plurality of split nodes and a plurality of leaf nodes. The root node is connected to the split nodes in a hierarchical structure, so that there are layers of split nodes, with each split node branching into a maximum of two nodes and where the terminal nodes are referred to as leaf nodes. Each split node has associated split node parameters. Values of split node parameters are learnt during training. The parameters specify types of features to be used and thresholds associated with a binary test. During training, labeled training data accumulates at the leaf nodes and is stored in an aggregated form. An ensemble of random decision trees may be trained and is referred to collectively as a random decision forest.

At test time, after the random decision forest has been trained, an input-output example is input to the trained forest to find a leaf node of each tree. Data accumulated at those leaf nodes during training may then be accessed and aggregated to give a predicted classification output, comprising a probability that a program which fits the input-output example, has each of a plurality of specified attributes. Due to the use of random selection of possible candidates for the split node parameters during the training phase, each tree in the forest has different parameter values and different accumulated data at the leaf nodes. By aggregating the results across trees of the forest improved accuracy and generalization ability is found.

A method of training a random decision forest to predict attributes of programs is now described. Training data 600 is accessed comprising input-output pairs and corresponding program attributes as described above with reference to FIGS. 6 and 7.

The number of decision trees to be used in a random decision forest is selected. A decision tree from the decision forest is selected and the root node is selected. A validation set and a tuning set are computed from the training data 600.

Using the tuning set, a plurality of models are randomly generated. Each model comprises values of split node parameters for use by a binary test performed at the node. For example, the parameters may include types of features of input-output pairs. The parameters may include decision stumps, specified through a threshold value and identifier for one of the features. The features are any derived feature from the input-output pairs, for example, any one or more of: the raw data of the input-output pair, the length of the input, the presence of certain elements in the input example, the presence of certain elements in the output example and others. The split node parameters influence how these features are used; for example decision stumps are used, which are specified by a pair of (feature-id, feature-value), so that the test performed is X[feature-id]>=feature-value. If this test evaluates to true one branch of the tree is taken, otherwise the other branch is taken.

Then, every model is applied to the validation set. For each combination of model and validation set, criteria (also referred to as objectives) are calculated. In an example, the calculated criteria comprise the information gain (also known as the relative entropy). The combination of parameters that optimize the criteria (such as maximizing the information gain) is selected and stored at the current node for future use. As an alternative to information gain, other criteria can be used, such as variance reduction, Gini entropy, or the 'two-ing' criterion or others.

It is then determined whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set as a leaf node. Similarly, the current depth of the tree is determined (i.e. how many levels of nodes are between the root node and the current node). If this is greater than a predefined maximum value, then the current node is set as a leaf node. Each leaf node has program attribute training examples which accumulate at that leaf node during the training process as described below.

It is also possible to use another stopping criterion in combination with those already mentioned. For example, to assess the number of example input-output pairs that reach the leaf. If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set as a split node. As the current node is a split node, it has child nodes, and the process then moves to training these child nodes. Each child node is trained using a subset of the training sensor data elements at the current node. The subset of sensor data elements sent to a child node is determined using the parameters that optimized the criteria. These parameters are used in the binary test, and the binary test performed on all input-output pairs at the current node. The input-output pairs that pass the binary test form a first subset sent to a first child node, and the input-output pairs that fail the binary test form a second subset sent to a second child node.

For each of the child nodes, the process as described above is recursively executed for the subset of sensor data elements directed to the respective child node. In other words, for each child node, new models are generated from the tuning set, applied to the validation set of input-output pairs, parameters optimizing the criteria selected, and the type of node (split or leaf) determined. If it is a leaf node, then the current branch of recursion ceases. If it is a split node, binary tests are performed to determine further subsets of sensor data elements and another branch of recursion starts. Therefore, this process recursively moves through the tree, training each node until leaf nodes are reached at each branch. As leaf nodes are reached, the process waits until the nodes in all branches have been trained. Note that, in other examples, the same functionality can be attained using alternative techniques to recursion.

Once all the nodes in the tree have been trained to determine the parameters for the binary test optimizing the criteria at each split node, and leaf nodes have been selected to terminate each branch, then input-output training examples with ground truth program attributes are accumulated at the leaf nodes of the tree. A representation of the accumulated program attributes may be stored such as storing parameters of a probability distribution fitted to a histogram of the accumulated program attributes, or storing another representation of a histogram of the accumulated program attributes.

Once the accumulated program attributes have been stored it is determined whether more trees are present in the decision forest (in the case that a forest is being trained). If so, then the next tree in the decision forest is selected, and the process repeats. If all the trees in the forest have been trained, and no others remain, then the training process is complete and the process terminates.

Figure 10:
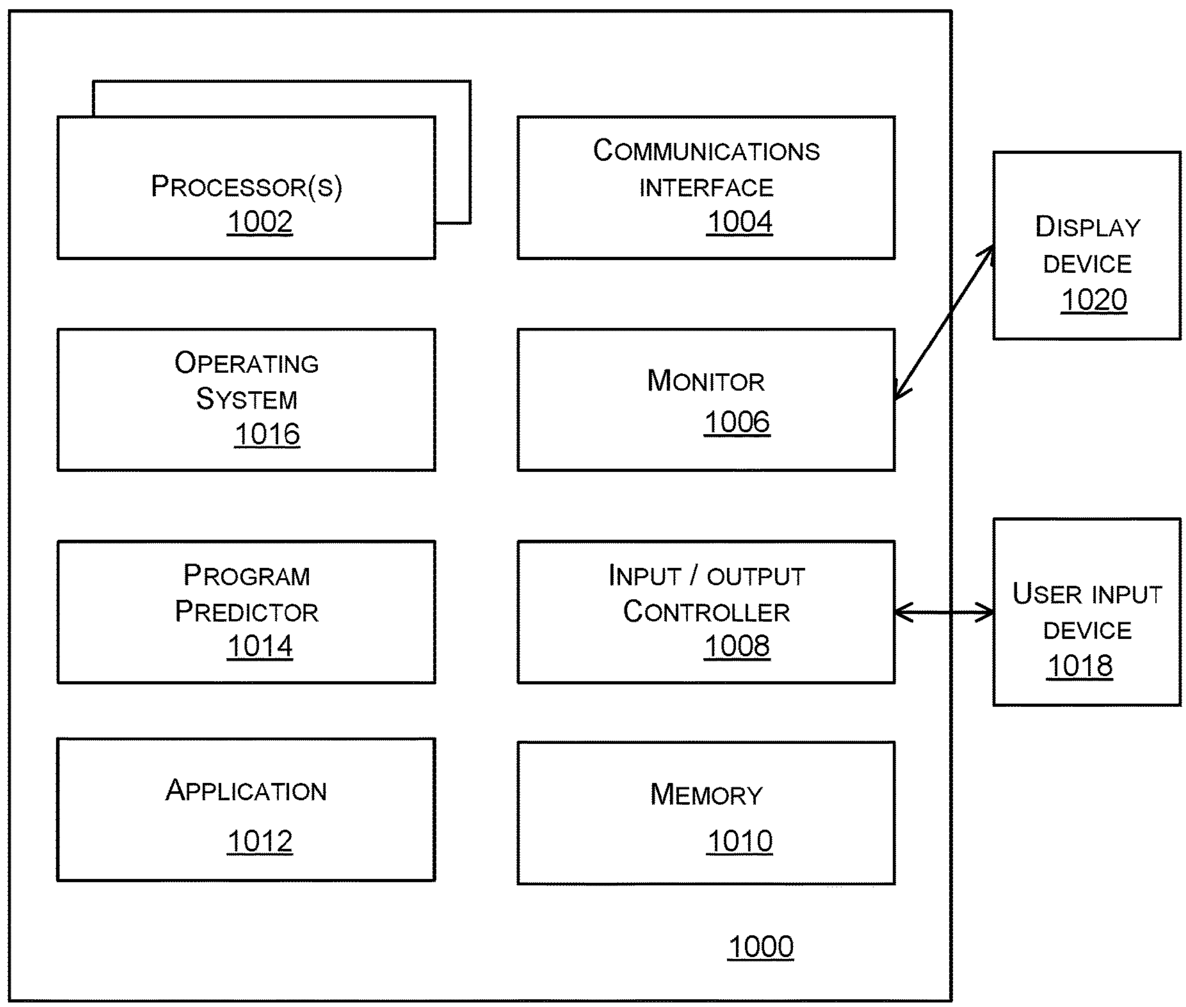
FIG. 10 illustrates an exemplary computing-based device in which embodiments of a program predictor are implemented.

FIG. 10 illustrates various components of an exemplary computing-based device 1000 which are implemented as any form of a computing and/or electronic device, and in which embodiments of a program predictor are implemented in some examples.

Figure 8:
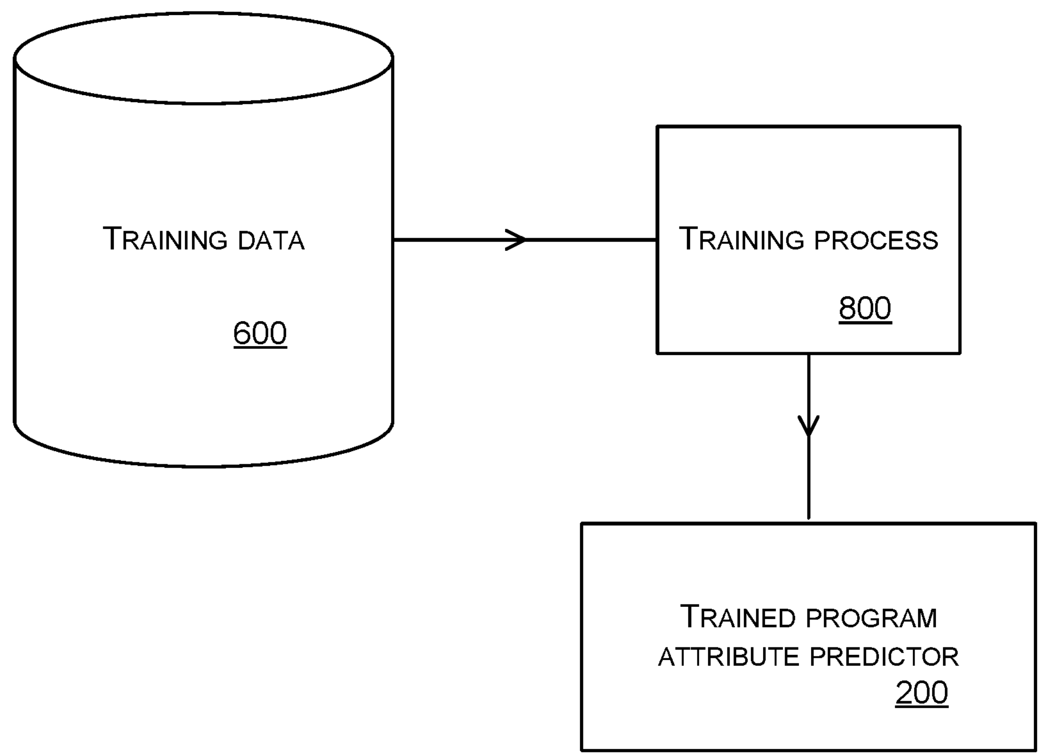
FIG. 8 is a flow diagram of a method of training a program attribute predictor.

Computing-based device 1000 comprises one or more processors 1002 which are microprocessors, controllers or any other suitable type of processors for processing computer executable instructions to control the operation of the device in order to predict programs given input-output pairs. In some examples, for example where a system on a chip architecture is used, the processors 1002 include one or more fixed function blocks (also referred to as accelerators) which implement a part of the method of FIGS. 3, 7, 8 in hardware (rather than software or firmware). Platform software comprising an operating system 1016 or any other suitable platform software is provided at the computing-based device to enable application software to be executed on the device. The application software is a spreadsheet application, a user interface, a file system viewer or other application software. The computing-based device comprises a program predictor 1014 as described herein. Computer storage media, such as memory 1010, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1010) is shown within the computing-based device 1000 it will be appreciated that the storage is, in some examples, distributed or located remotely and accessed via a network or other communication link (e.g. using communication interface 1004). Memory 1010 at the computing-based device comprises a data store which holds training data, encoder parameter values, decoder parameter values, objective functions, criteria, rules, input instances, output instances, encodings, revised encodings or other data.

The computing-based device 1000 also comprises an input/output controller 1008 arranged to output display information to a display device 1020 which may be separate from or integral to the computing-based device 1000. The display information may provide a graphical user interface. The input/output controller 1008 is also arranged to receive and process input from one or more devices, such as a user input device 1018 (e.g. a touch panel sensor, stylus, mouse, keyboard, camera, microphone or other sensor). In some examples the user input device 1018 detects voice input, user gestures or other user actions and provides a natural user interface (NUT). This user input may be used to specify input and output examples, specify sources of training data, to provide training objectives and for other purposes. In an embodiment the display device 1020 also acts as the user input device 1018 if it is a touch sensitive display device. The input/output controller 1008 outputs data to devices other than the display device in some examples, e.g. a locally connected printing device.

Any of the input/output controller 1008, display device 1020 and the user input device 1018 may comprise natural user interface (NUI) technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A computer program predictor comprising:

a processor configured to access a program attribute predictor; and a memory storing a search component configured to search a space of possible programs, to predict a program which, given an input data instance and an output data instance, will compute the output data instance from the input data instance, the search being guided by attributes predicted by the attribute predictor given the input data instance and the output data instance.

The computer program predictor described above where the search component is configured to search the space of possible programs using an exploration order which is influenced by the predictions of the program attribute predictor.

The computer program predictor described above where the program attribute predictor predicts a probability value for each of a plurality of possible functions and the search component searches for a new function to add to the program, from the plurality of possible functions, by assessing those sequentially in an order influenced by the probability values.

The computer program predictor described above where the search component is configured such that the most likely attributes, as predicted by the program attribute predictor, are assessed first.

The computer program predictor described above where the search component is configured to carry out a depth first search.

The computer program predictor described above where the search component is configured to maintain a plurality of active functions, so that the top k most probable functions according to the program attribute predictor are in the active set, and performs depth first search with the plurality of active functions.

The computer program predictor described above where the program attribute predictor is configured to predict one or more of: an indicator of whether a specified function is the first function used in the program, an indicator of whether a specified function is the last function used in the program, the presence of a loop in the program, the number of different functions used in the program.

The computer program predictor described above where the program attribute predictor is a machine learning system selected from one or more of: a neural network, a random decision forest, a kernel method, a linear logistic regression.

The computer program predictor described above where the program attribute predictor comprises a neural network encoder configured to encode individual input-output examples of a program into encodings and to pool the encodings into a single encoding.

The computer program predictor described above where the program attribute predictor comprises a neural network encoder and a neural network decoder and where the neural network encoder has a feed-forward architecture.

The computer program predictor described above where the program attribute predictor comprises a neural network encoder and a neural network decoder and where the neural network encoder has a gated recurrent neural network architecture.

The computer program predictor described above where the program attribute predictor comprises a neural network encoder which is a differentiable mapping from a set of M input-output examples generated by a single program to a latent real-valued vector.

The computer program predictor described above where the decoder is a differentiable mapping from the latent real-valued vector produced by the encoder to predictions of attributes of the program.

The computer program predictor described above where the program attribute predictor is a neural network having been trained using negative cross-entropy.

The computer program predictor described above wherein the predicted program comprises a spreadsheet formula of a spreadsheet application, and wherein the input data instance and the output data instance are extracted from the spreadsheet application.

The computer program predictor described above wherein the input data instance and the output data instance are patterns of user input at a user interface of a computing device.

The computer program predictor described above wherein the search component comprises a cache and is configured to cache intermediate results of the search and to reuse the cached intermediate results.

A computer-implemented method comprising:

accessing, using a processor, a program attribute predictor; and searching a space of possible programs, to predict a program which, given an input data instance and an output data instance, will compute the output data instance from the input data instance, the search being guided by attributes predicted by the attribute predictor given the input data instance and the output data instance; and wherein the predicted program comprises a spreadsheet formula of a spreadsheet application, and wherein the input data instance and the output data instance are extracted from the spreadsheet application.

A computer implemented method comprising:

accessing, using a processor, a program attribute predictor; and searching a space of possible programs, to predict a program which, given an input data instance and an output data instance, will compute the output data instance from the input data instance, the search being guided by attributes predicted by the attribute predictor given the input data instance and the output data instance.

The method described above comprising one or more of: offering the predicted program to an end user, storing the predicted program, executing the predicted program.

A computing apparatus comprising:

means for accessing a program attribute predictor; and means for searching a space of possible programs, to predict a program which, given an input data instance and an output data instance, will compute the output data instance from the input data instance, the search being guided by attributes predicted by the attribute predictor given the input data instance and the output data instance.

For example, the means for accessing is the processor described herein and the means for searching is the search component described herein.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A computer program predictor comprising:

a processor configured to access a program attribute predictor; and a memory storing a search component configured to search a space of possible programs, to predict a program which, given an input data instance and an output data instance, computes the output data instance from the input data instance, the search being guided by attributes predicted by the program attribute predictor given the input data instance and the output data instance, wherein the program attribute predictor predicts a probability value for each of a plurality of possible functions, wherein the search component searches for a new function to add to the program, from the plurality of possible functions, by assessing those sequentially in an order influenced by the probability values, wherein the search component is further configured to maintain a plurality of active functions, so that a plurality of top probable functions according to the program attribute predictor is in the active set, and wherein the search component performs a depth first search with the plurality of active functions prior to searching other programs of the space of possible programs.

2. The computer program predictor of claim 1, wherein the program attribute predictor having been trained on information about a plurality of programs, the information comprising: pairs of input and output data of the programs, and attributes of the programs.

3. The computer program predictor of claim 1, wherein the search component is configured to search the space of possible programs using an exploration order which is influenced by the predictions of the program attribute predictor.

4. The computer program predictor of claim 1, wherein the search component is configured such that the most likely attributes, as predicted by the program attribute predictor, are assessed first.

5. The computer program predictor of claim 1, wherein the program attribute predictor is configured to predict one or more of: an indicator of whether a specified function is a first function used in the program, an indicator of whether a specified function is the last function used in the program, a presence of a loop in the program, a number of different functions used in the program.

6. The computer program predictor of claim 1, wherein the program attribute predictor is a machine learning system selected from one or more of: a neural network, a random decision forest, a kernel method, and a linear logistic regression.

7. The computer program predictor of claim 1, wherein the program attribute predictor comprises a neural network encoder configured to encode individual input-output examples of a program into encodings and to pool the encodings into a single encoding.

8. The computer program predictor of claim 1, wherein the program attribute predictor comprises a neural network encoder and a neural network decoder and where the neural network encoder has a feed-forward architecture.

9. The computer program predictor of claim 1, wherein the program attribute predictor comprises a neural network encoder and a neural network decoder and where the neural network encoder has a gated recurrent neural network architecture.

10. The computer program predictor of claim 1, wherein the program attribute predictor comprises a neural network encoder which is a differentiable mapping from a set of M input-output examples generated by a single program to a latent real-valued vector.

11. The computer program predictor of claim 10, wherein a decoder is a differentiable mapping from the latent real-valued vector produced by the encoder to predictions of attributes of the program.

12. The computer program predictor of claim 1, wherein the program attribute predictor is a neural network having been trained using negative cross-entropy.

13. The computer program predictor of claim 1, wherein the predicted program comprises a spreadsheet formula of a spreadsheet application, and wherein the input data instance and the output data instance are extracted from the spreadsheet application.

14. The computer program predictor of claim 1, wherein the input data instance and the output data instance are patterns of user input at a user interface of a computing device.

15. The computer program predictor of claim 1, wherein the search component comprises a cache and is configured to cache intermediate results of the search and to reuse the cached intermediate results.

16. The computer program predictor of claim 1, wherein responsive to finding a program which, given an input data instance and an output data instance, computes the output data instance from the input data instance, the search component is configured to offer the found program to a user of the processor.

17. A computer implemented method comprising:

accessing, using a processor, a program attribute predictor; and searching a space of possible programs, to predict a program which, given an input data instance and an output data instance, computes the output data instance from the input data instance, the search being guided by attributes predicted by the program attribute predictor given the input data instance and the output data instance, wherein the program attribute predictor predicts a probability value for each of a plurality of possible functions, wherein the searching searches for a new function to add to the program, from the plurality of possible functions, by assessing those sequentially in an order influenced by the probability values, wherein the searching maintains a plurality of active functions, so that a plurality of top probable functions according to the program attribute predictor is in the active set, and wherein the searching performs a depth first search with the plurality of active functions prior to searching other programs of the space of possible programs.

18. The computer implemented method of claim 17 further comprising:

presenting, for selection, one or more new functions to add to the program based on the search; and based on a selection, adding a selected one or more new functions to add to the program.

19. One or more computer storage media having computer-executable instructions for computer program prediction that, upon execution by a processor, cause the processor to at least:

access a program attribute predictor; and search a space of possible programs, to predict a program which, given an input data instance and an output data instance, computes the output data instance from the input data instance, the search being guided by attributes predicted by the program attribute predictor given the input data instance and the output data instance, wherein the program attribute predictor predicts a probability value for each of a plurality of possible functions, wherein the search searches for a new function to add to the program, from the plurality of possible functions, by assessing those sequentially in an order influenced by the probability values, wherein the search maintains a plurality of active functions, so that a plurality of top probable functions according to the program attribute predictor is in the active set, and wherein the search performs a depth first search with the plurality of active functions prior to searching other programs of the space of possible programs.

* * * * *